United States Patent Office 2,865,339
Patented Dec. 23, 1958

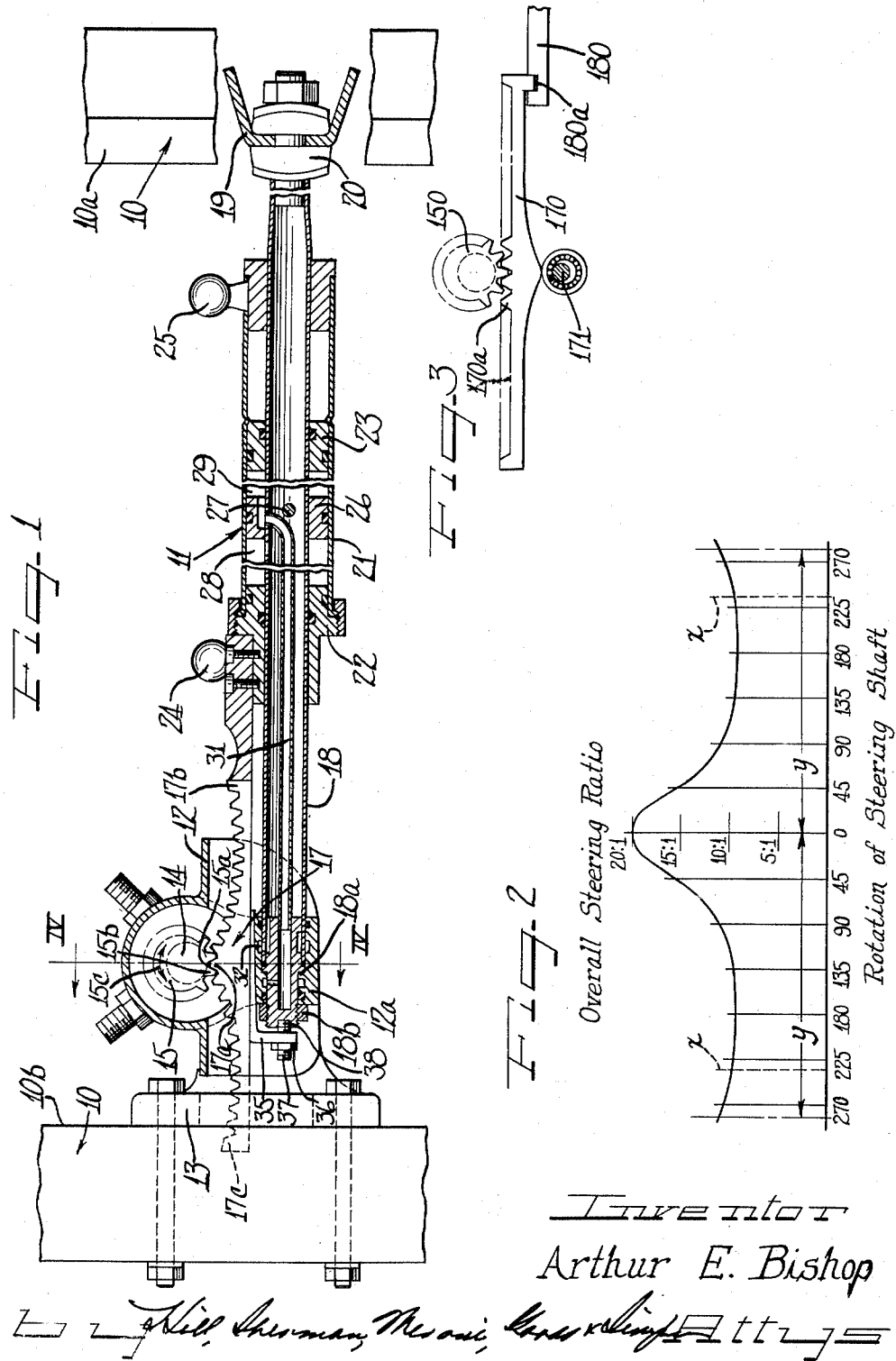

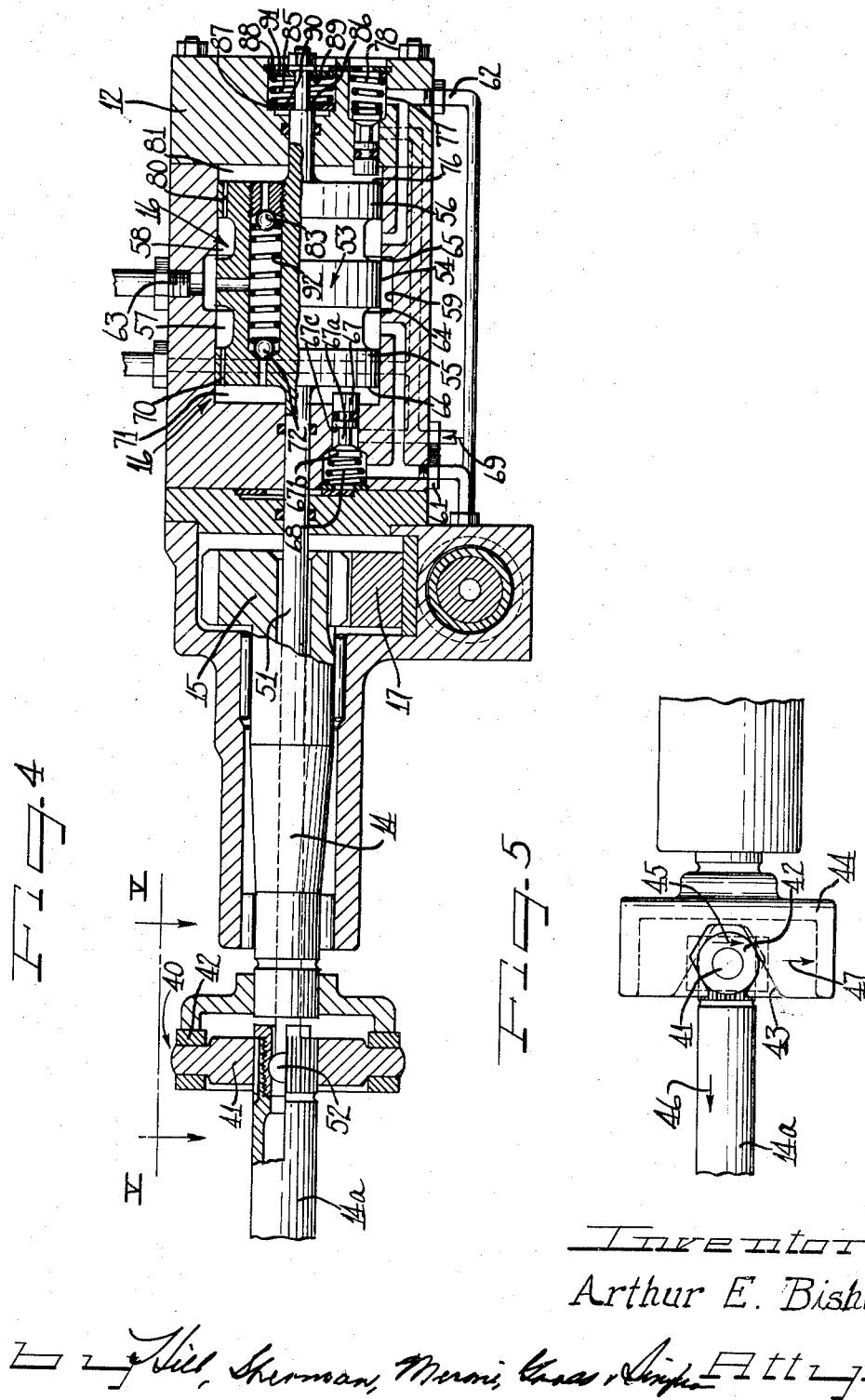

2,865,339

VARIABLE RATIO POWER STEERING APPARATUS

Arthur E. Bishop, Chatswood, near Sydney, New South Wales, Australia

Application November 10, 1955, Serial No. 546,210

3 Claims. (Cl. 121—46.5)

The present invention relates to steering apparatus for dirigible wheels in general and is, more particularly, concerned with the construction of a new and improved variable ratio steering gear for automotive vehicles or the like. The steering apparatus of the present invention may be used in manual steering systems but, as will be more fully described, it finds particularly advantageous utility in power actuated steering systems.

As has been pointed out in my earlier applications Serial Nos. 494,706 and 511,541, filed March 16, 1955, and May 27, 1955, respectively, the utilization of power steering apparatus for conventional motor vehicles has greatly increased in recent years. As a result, power steering is not only now commonplace in automotive vehicles but it is now being provided on even the least expensive automobiles and is in general demand by the motoring public.

Although the provision of power assist, or boost, in vehicle steering systems has very substantially reduced the amount of steering effort necessary by the vehicle operator and has, accordingly, substantially reduced the physical effort necessary for the steering of a vehicle, especially in slow speed turns, the heretofore commonly used manual steering gearing ratios have for the most part been retained. While automotive experts have generally recognized the desire for low ratio vehicle steering, or in other words more direct steering in which the steering wheel need be turned fewer revolutions to cause a corresponding turn in the dirigible wheels of the vehicle from one extreme to the other, such direct steering has been utilized in only one commercially manufactured American vehicle. The main reason for refusal to incorporate more direct gearing is that in the known prior art steering systems the use of direct steering causes driver fatigue at highway speeds on generally straight roads. This is true since the more direct steering ratios require only a very small degree of steering wheel turn to provide a substantial degree of vehicle turn and accordingly at high speeds continual wheel jockeying becomes necessary to keep the vehicle on the road and any sudden pulls or lurches at the steering wheel may cause the vehicle to leave the road unintentionally. This possibility of inadvertent oversteering is, of course, rendered even more acute where power steering is employed since small physical effort is required on the part of the vehicle operator to produce large vehicle deflections capable of putting the vehicle out of control.

The steering apparatus of the present invention provides the desirable benefits of low ratio or direct steering by providing such steering in the ranges of steering wheel movement ordinarily used in parking or traversing low speed turns. On the other hand, however, the steering system of the present invention provides relatively high ratio steering in the straight ahead or ordinary highway driving condition. This is accomplished through the provision of a variable ratio steering system in which the steering ratio changes from an initial high ratio, such as for example 20 to 1 in the straight ahead driving condition to a substantially lower ratio of, for example, approximately 10 to 1 in the range of steering wheel movement used in negotiating parking or other short radius turns. This is accomplished in the present invention through the utilization of cam or non-round gearing in the form of a rack and pinion drive connection between the steering wheel shaft and the dirigible wheels. In the straight ahead condition the cam gear secured to the steering shaft has a reduced radius portion which cooperates with what may be termed a humped rack portion thereby providing a maximum gear reduction or ratio in the straight ahead condition. As the steering wheel shaft is rotated, a larger radius portion of the cam gear thereon engages the reciprocating rack which is decreasingly humped as it moves out of its neutral or straight ahead position, thereby providing a substantially lower gear reduction or ratio between the steering wheel shaft and the vehicle wheels.

In accordance with the principles of the present invention, power boost is applied to the reciprocating rack so that the power applied by the power motor is applied directly to the wheels without variation independently of the degree of wheel turn. At the same time, valve control for the power motor is associated with the steering wheel shaft and hence is properly related to the exact feel at the steering wheel in spite of the variable steering ratio between the valve and the vehicle wheels. In further accordance with the principles of the present invention, a closed-center or non-continuous flow valve is utilized to permit operation of the system with the recently developed central-power systems in which a single central source of hydraulic fluid under pressure is provided for actuation of all of the power devices on a single vehicle. Such systems commonly employ an hydraulic accumulator which maintains hydraulic fluid under sufficient pressure to actuate the hydraulic controls of the vehicle through several actuation cycles even though the vehicle motor is not in operation. The utilization of such an accumulator, however, requires that no fluid leakage be permitted except during such times as power actuation of some device is desired. Accordingly, a control valve for the power steering must be incorporated which applies motive fluid to the power cylinder ports only during periods in which power is demanded. In all other conditions, the power steering valve is completely closed thereby permitting retention of fluid under pressure in the accumulator of the central system.

Accordingly, it is an object of the present invention to provide a new and improved variable ratio steering apparatus.

Another object of the present invention is to provide a simple, inexpensive, vehicle steering apparatus providing a high ratio, relatively indirect, steering in the vehicle-straight-ahead condition and a substantially lower ratio for more direct steering as the vehicle leaves its straight ahead condition.

Yet a further object of the present invention is to provide an improved vehicle steering system in which the steering wheel need turn only slightly more than one turn in order to provide movement of the vehicle wheels from one extreme position of turn to the other.

Still a further object of the present invention is to provide a novel and substantially improved closed center power steering control system capable of utilization with a centralized hydraulic accumulator power source.

A feature of the invention resides in the utilization of a cam gear steering wheel shaft-to-vehicle wheel connection.

Another feature of the invention resides in the utilization of a variable ratio mechanism between the rotatable steering shaft and reciprocating wheel actuating member characterized by the provision of a small mechanical advantage connection between the shaft and said member when the said member is in its neutral, or vehicle straight ahead, condition and a substantially greater mechanical advantage connection when said member is in positions removed from said neutral condition.

Another feature of the invention resides in the provision of a novel closed-center power steering valve in which the power applying chambers of the steering fluid motor are completely relieved of fluid under pressure and are vented to a low pressure sump in all conditions of vehicle operation in which the power is not applied to said member.

Still a further object of the present invention is to provide a substantially simplified and extremely inexpensive variable ratio power steering system in which an extremely sharp vehicle turn may be made without requiring a complete turn of the vehicle wheel.

Still a further feature of the invention resides in the provision of a normally closed power steering valve in which hydraulic fluid under pressure is selectively directed to opposite sides of a power steering motor through a fluid pressure balanced poppet valve thereby providing smooth steering action.

Still other and further objects and features of the present invention will at once become apparent to those skilled in the art from a consideration of the attached drawings wherein a preferred form of the invention is shown by way of illustration only, and wherein:

Figure 1 is a plan view of the steering apparatus of the present invention shown partially broken away and in cross section to emphasize internal components;

Figure 2 is a graph illustrating the variation in steering ratio provided by the system illustrated in Figure 1;

Figure 3 is a modified form of the steering structure illustrated in Figure 1, shown substantially in plan view;

Figure 4 is a side elevation view in cross section taken along the line IV—IV of Figure 1; and Figure 5 is a fragmental view taken along the line V—V of Figure 4.

As shown on the drawings:

As may be seen in Figure 1, a vehicle frame 10 having longitudinally extending frame side rails 10a and 10b is provided with a transversely mounted power steering apparatus 11. As shown, the apparatus 11 comprises a housing 12 secured by means of a flange 13 to the longitudinal frame side member 10b. The housing 12 encloses the steering wheel shaft 14, an eccentric or cam gear 15, valve 16, and provides for passage therethrough of rack 17. A transversely extending brace or support rod 18 having a smooth outer cylindrical surface is secured to the longitudinally extending frame side rail 10a by means of a downwardly depending bracket 19 and rubber grommet 20. The support rod 18 is likewise rigidly secured to the longitudinally extending frame side rail 10b by abutment 18a and a securing nut 18b which cooperate with the portion 12a of the housing 12 to fixedly secure the support 18 against movement along the longitudinal axis.

Rack 17 is fixedly secured to a power cylinder member 21 which is slidably carried on rod 18 by cylinder heads 22 and 23 and which in turn carries ball studs 24 and 25 for connection to dirigible vehicle wheels through conventional tie rods, not shown. The piston 26 is secured to the support rod 18 by means of a pin 27, or other equivalent thereof, and accordingly the application of fluid under pressure to the chamber 28 will cause movement of the studs 24 and 25 toward the left as viewed in Figure 1 and the application of fluid pressure to chamber 29 will cause a movement of the studs toward the right as viewed in that figure. Hydraulic fluid under pressure is introduced into the chamber 28 via aperture 30 and into chamber 29 via conduit 31. The aperture 30 is in fluid connection with fluid port 32 in the housing 12 and the conduit 31 is in fluid connection with the port 33.

The ports 32 and 33 are connected to the power steering control valve as will be described further below.

The rack 17 and the gear 15 provide a variable ratio of force transmission in the manner of positive acting cams. As may be seen, the minimum radius point 15a of the gear 15 cooperates with a point 17a, which may be termed a point of maximum projection, of the rack cam 17. In this position, the mechanical advantage or leverage of the system provides a maximum ratio, or a ratio in which a maximum angular movement of the shaft 14 must be provided to cause an increment of movement of the cam rack 17. As the steering shaft 14 is rotated by the steering wheel, not shown, the cam gear 15 increases in effective radius as the cam rack 17 decreases in the amount of projection toward the gear. As a result, the ratio decreases until at a point of one-half turn of the steering wheel shaft 14, or 180° of movement thereof, a point of maximum radius 15b, with equivalent minimum ratio, is reached. In actual practice it is preferred that the gear 15 be provided with a maximum radius or minimum ratio portion extending through an arc of rather substantial nature, such as indicated at 15c and accordingly the steering wheel may be rotated beyond the 180° point for a substantial distance without causing a substantial increase in ratio. The above performance characteristics may be more clearly seen from a consideration of Figure 2 wherein the over-all steering ratio of the vehicle is plotted against angular turn of the steering wheel shaft 14 away from a neutral or vehicle-straight-ahead condition. As may be seen in that figure the vehicle steering system as a whole is preferably engineered to provide a maximum ratio, or a maximum degree of steering insensitivity, in the straight ahead driving condition of approximately 20 to 1. This ratio is approximately average for manual steering systems of the automotive industry and comprises the ratio of turns of the steering wheel to turns of the individual dirigible wheel about its steering pivot axis. In the system herein shown, as the steering wheel shaft rotates away from the neutral, straight ahead condition, the ratio decreases substantially, and at a rapid rate, to a minimum steering ratio of approximately 10 to 1 in which an angular movement of the steering wheel shaft 14 will result in an angular movement of the dirigible wheel at a rate twice that provided in the high ratio, straight ahead driving condition. As a result of the structure of the present invention, therefore, the vehicle driver is provided with a high ratio, relatively insensitive, or indirect, steering when the vehicle is in the straight ahead position or negotiating relatively low degree turns such as ordinarily found on main highways. When the vehicle is being parked, or is negotiating slow speed turns such as street intersections or the like in which large angles of turn are required the ratio of the steering is substantially decreased and such turns may be negotiated with only a relatively small amount of turn at the steering wheel. As a result, it is possible to construct a steering system in which the steering wheel provides complete steering control from one extreme position of turn to the other with approximately one and one-half turns of the steering wheel, a condition which compares extremely favorably with present day conventional steering systems which require approximately four turns of the steering wheel to provide the same degree of turn.

It will be apparent from a consideration of Figures 1 and 2 that continued rotation of the cam gear 15 beyond a point indicated at X on Figure 2, will cause an increase in ratio, at a relatively slow rate until a point Y is reached at which time the rate substantially increases again to the same maximum reached in the straight ahead condition. For practical purposes, the amount of increase in ratio between the points X and Y is insufficient to negative its use in commercial vehicles so it is considered desirable to construct the steering to provide for lock to lock steering wheel turn between opposite points Y. This action necessitates a slight increase in the projection of the teeth of the cam rack 17 at opposite ends, as indicated at 17b and 17c. It will be understood, of course, that the change in ratio may be varied when utilizing the present invention by changing the contour of the cam gear 15. The particular arrangement shown is, however, very satisfactory.

It will be further understood that in accordance with the principles of the present invention, the cam gear 15 may be matched with a second cam gear rotating about an axis substantially parallel to the axis of rotation of gear 15 and matched therewith so that rotation of the cam gear 15 will provide an increasingly greater angular rotation of the second cam gear as the gear 15 moves away from its neutral, vehicle-straight-ahead condition. The second cam gear may then be connected to the dirigible wheels through a conventional vehicle steering linkage such as is ordinarily connected to a vehicle pitman arm. In that case, of course, the pitman arm would be directly connected to the second cam gear shaft.

In the illustration shown in Figure 3, a modified form of cam gear and cam rack is shown. As may there be seen, a rack 170 is connected to a tie rod actuating rod member 180 and carries rack teeth 170a which cooperate with a cam gear 150 substantially identical to cam gear 15 above described. The back surface of the cam rack 170, indicated at 170b is provided with a humped shape and cooperates with an eccentrically mounted back-up roller 171. As the cam gear 150 is rotated the cam rack 170 is permitted to move transversely of its axis of reciprocation, away from the gear 150 by reason of the decrease in width of the rack. It will, of course, be recognized that the rack 170 must, accordingly, be provided with a connection at 180a which permits movement thereof in a direction transverse to the axis of reciprocation of the rod 180.

As in the case of all steering systems it is imperative that the systems herein described be adjustable to eliminate backlash. Accordingly, the back-up roller 171 is pivoted about an eccentric shaft to permit its adjustment toward and away from the gear 150, thereby urging the teeth 170a into snug engagement with the teeth of the cam gear. In the embodiment shown in Figure 1, a wedge 35 is positioned between the housing 12 and the rack 17 and is adjustable by means of an adjusting nut 36 carried on screw 37 which is in turn threadedly secured to the support member 18 as at 38. Adjustment of the wedge 35 toward the right as viewed in Figure 1 will, of course, cause the teeth of the cam rack 17 to be snugly engaged with the teeth of the cam gear 15, thereby providing a non-lash system with substantially no lost motion.

The motive power for actuating the ball studs 24 and 25 may be provided by any source of high pressure hydraulic fluid, not shown, and is under the control of a power steering valve preferably taking the form shown at 16 in Figure 4. As may there be seen, the steering shaft comprises a shaft portion 14 and a second portion 14a, the latter of which is connected to a steering wheel. While such a steering wheel may, of course, be conventional in shape it is preferred, in view of the fact that it is required to turn only slightly greater than one-half a turn in either direction, that it comprise a non-round steering wheel such as the type used in aircraft control in which the top, or the bottom, or both of the normally circular wheel are flattened out, thereby increasing the leg room for the vehicle operator and also permitting reduction in the effective height of the steering wheel thereby permitting comfortable operation of the vehicle by shorter operators.

The shaft 14 carries the cam gear 15 and is rotated by the shaft 14a through a slight lost motion coupling generally indicated at 40. This may take various forms but in the construction illustrated, comprises a universal joint spider 41 rigidly secured for rotation with the shaft 14a and carrying a roller 42 which cooperates with an angular slot 43 in the drum 44. As may be seen from a consideration of Figure 5, rotation of the shaft 14a in the clockwise direction will cause a movement of the spider 41 with its roller 42 in the direction of the arrow 45 which will, in view of the slot 43 cause an initial movement of the shaft 14a outwardly in the direction of the arrow 46 and a subsequent rotation of the drum 44 in the direction of the arrow 47. Counterclockwise rotation of the shaft 14a will, of course, cause a reverse, or downward movement of the shaft 14a. Reciprocation of the shaft 14a in turn causes reciprocation of the valve generally indicated at 16 by means of the valve actuating rod 51 secured to the shaft 14a by means of a ball connection 52 which permits slight misalignment of the shaft 14a relative to the shaft 14 without seriously affecting operation of the valve.

The valve 16 may be of various types but preferably comprises, in the present instance, a reciprocating spool valve which may be termed a closed center or non-continuous-flow type in which no hydraulic fluid under pressure flows through the valve when it is in its neutral condition. This is a particularly desirable attribute in valves to be used in central power systems of the type in which a single large capacity source of hydraulic fluid is provided for a number of hydraulically actuated accessories and wherein a high pressure hydraulic accumulator is provided to permit actuation of any of the various power accessories over a span of several actuations, after the vehicle engine and, hence the source of power, are shut down. In such a central system it is imperative that the power steering valve completely block off the flow of fluid under pressure when it is in its neutral condition since the provision of a continuous flow valve would permit complete depletion of the hydraulic reservoir within a matter of seconds.

As shown, the valve 16 comprises a valve core 53 having a central land 54 and end lands 55, 56 separated from central land by grooves 57 and 58 respectively. The land 54 cooperates with an annular groove 59 in the housing 12 and the grooves 57 and 58 cooperate, respectively, with conduits 61 and 62 which lead in turn to the respective ports 32 and 33. As may be seen the groove 59 is of somewhat greater width than the cooperating land 54 so that in the neutral condition of the parts fluid may flow readily from either the cylinder chamber 28 or 29 to a low pressure sump or outlet 63 via conduits 61 and 62, grooves 57 and 58, gaps 64 and 65, annular groove 59 and outlet 63.

As a turn is commenced, for example, by movement of the steering shaft 14a in a clockwise direction to turn the vehicle toward the right, movement of the valve actuating rod 51 toward the left as viewed in Figure 4, is required. This movement closes the gap 64 thereby cutting off conduit 61 from the low pressure outlet 63. Substantially simultaneously with closure of the gap 64, the end 66 of the core 53 contacts a poppet valve 67 urging it toward the left into an open position, against control spring 68. Hydraulic fluid under pressure is provided at the inlet 69 and with the opening of the poppet valve 67 this fluid under pressure is directed to the conduit 61 and from thence to chamber 28 causing movement of the ball studs 24 and 25 toward the left as viewed in Figure 1 with a resultant clockwise or right hand steering motion of the vehicle wheels through conventional tie rod and steering arm linkages. Movement of the ball studs 24 and 25 is, of course, accompanied by corresponding left hand movement of the cam rack 17 which causes a rotation of the shaft 14 in the clockwise direction to provide a follow up action for the valve tending to recenter it at each position of turn.

Upon opening of the poppet valve 67, hydraulic fluid under pressure will flow through the conduit 61 in the housing 12 to the annular groove 57 and from thence through the restricted orifice 70 to the space 71. Since fluid in the chamber 71 will, accordingly, be substantially proportional to the fluid pressure in the conduit 61 and hence in the power motor chamber 28, a hydraulic feel pressure will act against the left hand end face 66 of the core 53 tending to urge it toward the right in opposition to the valve actuating force. This feel will be felt in the steering column 14a through the direct ball connection 52 and will be transmitted to the driver thereby providing the steering system with proportional "feel." Upon the application of a predetermined maximum feel pressure, ball valve 72 will be unseated venting the chamber 71 to the low pressure outlet 63. This relief valve action is deemed desirable since it provides a limited feel which reduces the force necessary at the steering wheel during parking, when extremely accurate feel is not considered necessary.

Movement of the steering shaft 14a in counterclockwise direction will provide actuation of the valve core 53 toward the right as viewed in Figure 4 and will cause blocking off of the gap 65 and a resultant build up of pressure in the conduit 62 by reason of opening of the poppet valve 77 by the end face 76 of the valve core 53, against the action of spring 78. Feel back is provided by the pressure bleed through the restricted orifice 80 into chamber 81 and, as in the case of right hand steering, the feel is limited by means of the ball check valve 83 to a predetermined maximum value.

In addition to the follow up action of the system as a whole, as above described, it will be noted that the valve core 53 is biased into a neutral, centered condition by means of a spring 85 which cooperates with abutments 86, 87, 88 and 89 through end plates 90 and 91. As a result of this construction, movement of the valve core 53 out of its centered position, in either direction, will cause compression of the spring 85 and a resultant biasing force tending to return the core to its neutral condition.

It will be noted relative to the structure above set forth, that the fluid under pressure applied at the conduit 69 is directed to the poppet valves 67 and 77 in such a manner as to balance these valves. Thus, pressure in the chamber 67a will act equally against the head 67b of the valve 67 and the base 67c thereof. When the valve 67 is open the pressure balance does not change and accordingly the steering action is smooth rather than erratic as would be the case in a non-balanced valve construction. The same operational characteristics are, of course, present relative to the poppet valve 77. It will also be noted that the gap 64 is substantially equal to the spacing between the end surface 66 and the poppet valve 67 thereby causing opening of the valve 67 simultaneously with the closing of the gap 64. If desired, the distance between the poppet valve 67 and the valve end face 66 may be reduced somewhat to cause opening of the valve a very slight amount prior to closing of the gap 64 to provide an overlapping, smooth, valve response.

In one satisfactory operational system, the spring 85 is provided with an initial compression requiring a positive, approximately one pound, pull at the steering wheel rim before any movement of the valve core 53 out of the central position was permitted. The relief valve spring 92 was chosen of a sufficient strength to open at the end of the normal driving range and the beginning of the range of power steering movement in which the vehicle is being parked. Thus, the feel back is provided in a truly proportional sense throughout the ordinary driving range subsequent to the initial one pound steering torque application, but retains its relatively low maximum values throughout the parking range. In actual practice ordinary steering design usually permits the driving range of power steering torque application of approximately one-third of the total torque applicable in parking as a maximum value. Thus, utilizing the pressure relief valves 72 and 82, feel back is maintained at a maximum cut off value throughout the upper two-thirds of the torque range of the power steering system, thereby minimizing the torque necessary at the steering wheel in the parking situation and rendering the system more desirable to women and elderly people.

In the system shown, the full power of the power steering fluid motor is applied to steering even though the actual steering wheel to steered wheel ratio varies over a wide range. This is desirable since the actual torque at the steering wheels, and hence the actual torque reflected in the fluid pressure in the conduit 61, controls the feel back of the system and the actual feel at the steering wheel is accordingly proportional to the torque applied at the wheels in spite of the variations in steering ratio inherent in the mechanical connection between the steering wheel and the steered wheels.

It will thus be seen that I have provided a novel and superior power steering system for vehicles, wherein a highly desirable variable ratio is provided in conjunction with novel and highly efficient power application. It will, of course, be apparent to those skilled in the art that variations and modifications, in addition to those above mentioned, may be made in the structures hereinabove described without departing from the scope of the novel concepts of the present invention. Accordingly, it is my intention that the scope of the present invention be limited solely by the scope of the hereinafter appended claims.

I claim as my invention:

1. A valve for hydraulic power steering systems comprising a housing, a reciprocable valve core in said housing having a central annular land cooperating with a first annular low pressure sump groove in the housing, second and third annular groves in said core on opposite sides of said land in fluid connection with said groove when said core is in a central, neutral condition, a first port in said housing facing said second grove and connected to one side of a reversible power motor, a second port in said housing facing said third groove and connected to the other side of said reversible power motor, a source of fluid under pressure, a first conduit connecting said source to said first port, a second conduit connecting said source to said second port, first and second valve means normally blocking said first and second conduits when said core is in neutral condition, means associated with said core for actuating said first valve means into open position and substantially simultaneously closing the fluid connection between said first and second grooves, and further means associated with said core for actuating said second valve means into open position and substantially simultaneously closing the connection between said first and third grooves.

2. A valve for hydraulic power steering systems comprising a housing, a reciprocable valve core in said housing having a central annular land cooperating with a first annular low pressure sump groove in the housing, second and third annular grooves in said core on opposite sides of said land in fluid connection with said groove when said core is in a central, neutral condition, a first port in said housing facing said second groove and connected to one side of a reversible power motor, a second port in said housing facing said third groove and connected to the other side of said reversible power motor, a source of fluid under pressure, a first conduit connecting said source to said first port, a second conduit connecting said source to said second port, first and second valve means normally blocking said first and second conduits when said core is in neutral condition, means associated with said core for actuating said first valve means into open position and substantially simultaneously closing the fluid connection between said first and second grooves, further means associated with said core for actuating said second valve means into open position and substantially simultaneously closing the connection between said first and third grooves, and means applying fluid pressure built up in said second or third grooves subsequent to actuation of said first or second valve means, against said valve core to oppose the movement of said core in the direction of movement initiated to open said first or second valve means.

3. A valve for hydraulic power steering systems comprising a housing, a reciprocable valve core in said housing having a central annular land cooperating with a first annular low pressure sump groove in the housing, spring centering means positioned between said core and said housing for biasing said core into a neutral centered condition, second and third annular grooves in said core on opposite sides of said land in fluid connection with said groove when said core is in a central, neutral condition, a first port in said housing facing said second groove and connected to one side of a reversible power motor, a second port in said housing facing said third groove and connected to the other side of said reversible power motor, a source of fluid under pressure, a first conduit connecting said source to said first port, a second conduit connecting said source to said second port, first and second valve means normally blocking said first and second conduits when said core is in neutral condition, means associated with said core for actuating said first valve means into open position and substantially simultaneously closing the fluid connection between said first and second grooves, further means associated with said core for actuating said second valve means into open position and substantially simultaneously closing the connection between said first and third grooves, and means applying fluid pressure built up in said second or third grooves subsequent to actuation of said first or second valve means, against said valve core to oppose the movement of said core in the direction of movement initiated to open said first or second valve means.

References Cited in the file of this patent

UNITED STATES PATENTS

| | | |
|---|---|---|
| Re. 26,854 | MacDuff | Aug. 5, 1952 |
| 458,191 | Ripley | Aug. 25, 1891 |
| 2,627,187 | Davis | Feb. 3, 1953 |
| 2,679,235 | Van Meter | May 25, 1954 |
| 2,757,643 | Hunter | Aug. 7, 1956 |

FOREIGN PATENTS

| | | |
|---|---|---|
| 7575 | Great Britain | of 1900 |